April 29, 1924.
F. BROWN
1,491,899
REAR CAM SHAFT BUSHING EXTRACTOR AND RESTORER FOR FORD MOTORS
Filed Sept. 25, 1922
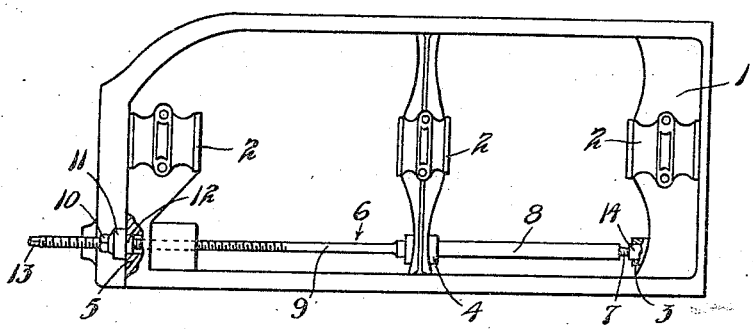
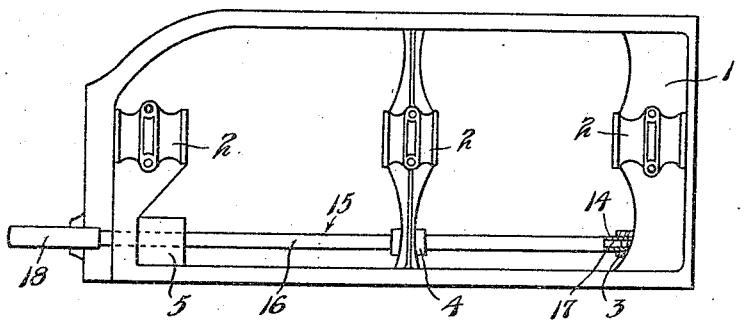
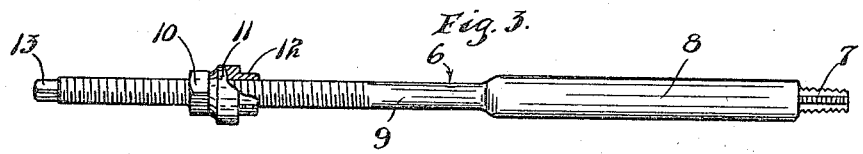
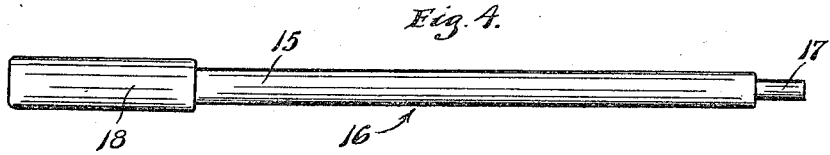
INVENTOR.
FRED BROWN,
BY HIS ATTORNEY.
James F. Williamson Patented Apr. 29, 1924.

1,491,899

UNITED STATES PATENT OFFICE.

FRED BROWN, OF MINNEAPOLIS, MINNESOTA.

REAR-CAM-SHAFT-BUSHING EXTRACTOR AND RESTORER FOR FORD MOTORS.

Application filed September 25, 1922. Serial No. 590,337.

*To all whom it may concern:*

Be it known that I, FRED BROWN, a citizen of the United States, residing at Minneapolis, in the county of Hennepin and State of Minnesota, have invented certain new and useful Improvements in Rear-Cam-Shaft-Bushing Extractors and Restorers for Ford Motors; and I do hereby declare the following to be a full, clear, and exact description of the invention, such as will enable others skilled in the art to which it appertains to make and use the same.

This invention relates to an automobile engine, particularly, of the type of the well known Ford machine and especially to means for removing and replacing the rear cam shaft bearing bushing. In the motor of the Ford automobile and similar types there are customarily provided three alined bearings in which bushings are placed to carry the cam shaft. The rear end bearing is quite difficult of access and it is a long and difficult operation to remove and replace the bushing therein when such operation is necessary or desired.

It is an object of this invention to provide a simple and efficient tool by which the bushing in the said rear bearing can be quickly removed.

It is also an object of the invention to provide a tool for quickly and easily replacing said removed bushing with a new one.

It is still another object of the invention to provide a bushing removing tool having means adapted to be received by and secured to the bushing to be removed and means adapted to abut the front cam shaft bearing, together with means engaging the tool and bearing against said last mentioned means to move the tool and engaged bushing longitudinally.

These and other objects and advantages of the invention will more fully appear from the following description made in connection with the accompanying drawings in which like reference characters refer to the same parts throughout the different views, and in which, Fig. 1 is a view in side elevation somewhat diagrammatically, showing a Ford motor and the bushing removing tool applied thereto;

Fig. 2 is a similar view showing the bushing replacing tool applied in operative position;

Fig. 3 is a view in side elevation partly in section of the bushing removing tool; and Fig. 4 is a view in side elevation of the bushing replacing tool.

Referring to the drawings, an automobile motor of the well known Ford type is shown at 1 having the plurality of crank shaft bearings 2 and the rear bearing 3 for the cam shaft, an intermediate bearing 4 for said shaft and the front end bearing 5 for said cam shaft. These bearings are customarily provided with bushings of bronze or other anti-friction metal. The bushings in the bearings 4 and 5 can be removed with but little difficulty. The removal of the bushing from the bearing 3 by the usual operation, however, is quite difficult. In accordance with the present invention, a tool designated generally as 6 is used comprising a round bar or rod having at one end a short tapered and threaded portion 7. As illustrated, this portion comprises four flat jaws at right angles to each other with the threads on their outer surfaces. The tool also has an intermediate cylindrical portion 8, the outer end of which forms a shoulder adjacent the portion 7. From the inner end of the portion 8 extends a cylindrical reduced portion 9 of the tool, the greater and outer portion of which is threaded and receives thereon the angular shaped nut 10. A sleeve 11 is slidably mounted on the portion 9 of the tool and is formed to abut the nut 10 at its outer end and has a reduced shoulder forming portion 12 at its inner end of a diameter adapted to be received in the bore of the front bearing 5 of the motor. The tool 6, at its front end, is preferably provided with a short square or angularly shaped portion 13. The diameter of the portion 8 is such as to be received in and substantially fit the bore of the intermediate cam shaft bearing 4.

In the bushing removing operation, the tool 6 will be extended longitudinally through the bearings 4 and 5, as shown in Fig. 1 and will be substantially centered in alinement with said bearings, the portion 8 being received in the bearing 4. The tool is now turned by the application of a wrench or other suitable means to the portion 13 and the tapered threaded portion 7 screwed into the bushing 14 in the bearing 3 which bushing is to be removed. After said threaded portion has been securely engaged in the bushing, the sleeve 11 is moved so that the shoulder formed by the portion 12 abuts against the front portion of the bearing 5. The nut 10 is now turned in engagement with the sleeve 11, and the nut being thus held against longitudinal movement, the threads thereof act to move the tool longitudinally, and the same draws the bushing 14 from the bearing in its longitudinal movement. The bushing is thus quickly and easily removed with no damage to the bearings.

To insert a new bushing in the bearing 3 the tool shown in Fig. 4 and designated generally as 15 is used. This tool comprises an intermediate cylindrical portion 16 of a diameter adapted to be received in the intermediate bearing 4, a reduced portion 17 at its inner end forming a shoulder with the portion 16 and of a diameter adapted to fit in the bore of the bushing to be placed in position. The outer end of the tool has an enlarged cylindrical portion 18 thereon forming a shoulder with the portion 15. In the standard motor, the distance between the front end of the rear bushing and the front end of the bearing 5 is usually fixed and the bushing projects more or less from the rear bearing 3. The distance between the shoulders on the tool 16 is made of the said required fixed distance.

To replace the bushing, the tool 16 is disposed in the bearings 4 and 5, as shown in Fig. 2 and will be substantially centered therein. The bushing is now placed on the portion 17 with its end abutting the shoulder of said portion and the tool 16 is then driven longitudinally to force the bushing into the bearing 3. As soon as the shoulder on the portion 18 of the tool abuts the front end of the bearing 5, the bushing will be properly placed in position to give the correct location of the cam shaft and the tool can then be withdrawn.

From the above description it is seen that applicant has provided a very simple and efficient means for moving and replacing the bushing in the end bearing 3. With the tools described, such bushing can be readily removed and replaced while the motor is bolted in place in the car, so that removal of the motor is unnecessary. The tools are simple and can be inexpensively made and are, at the same time, very rugged and durable. By the use of these tools a great saving of time and labor is made in the described operation. The tools have been widely used in actual practice and found to be exceedingly efficient for the purpose intended.

It will, of course, be understood, that various changes may be made in the form, details and proportions of the parts without departing from the scope of applicant's invention, which, generally stated, consists in the matter shown and described and set forth in the appended claims.

What is claimed is:

1. A tool for operating on the cam shaft bushing of a Ford or similar automobile motor comprising, a portion adjacent one end having a shoulder adapted to abut the front end of the front cam shaft bearing, an intermediate portion of a different diameter substantially fitting in the intermediate cam shaft bearing, and a reduced portion at its other end adapted to be received in and move a bushing in the rear cam shaft bearing.

2. A tool for removing a bushing from the rear cam shaft bearing of a Ford automobile motor comprising, a rod having a threaded portion adjacent one end, said end having an angular head thereon, an enlarged smooth intermediate portion on said rod adapted to fit in the intermediate cam shaft bearing of said motor, a reduced threaded and tapered projection at the other end of said rod adapted to be engaged in said bushing, a shouldered sleeve slidable on said threaded portion of said rod and adapted to fit in and against the front cam shaft bearing, and a nut engaging said threaded portion and abutting said sleeve to move the rod and bushing longitudinally.

In testimony whereof I affix my signature.

FRED BROWN.